United States Patent
Hord

(10) Patent No.: US 9,821,617 B1
(45) Date of Patent: Nov. 21, 2017

(54) EQUALIZER DEVICE FOR TANDEM AXLE VEHICLES

(71) Applicant: Richard Hord, Brenham, TX (US)

(72) Inventor: Richard Hord, Brenham, TX (US)

(*) Notice: Subject to any disclaimer, the term of this patent is extended or adjusted under 35 U.S.C. 154(b) by 27 days.

(21) Appl. No.: 15/197,619

(22) Filed: Jun. 29, 2016

(51) Int. Cl.
*B60G 5/047* (2006.01)
*B60G 15/06* (2006.01)
*B60G 11/34* (2006.01)

(52) U.S. Cl.
CPC .............. *B60G 5/047* (2013.01); *B60G 11/34* (2013.01); *B60G 15/06* (2013.01); *B60G 2200/30* (2013.01); *B60G 2202/112* (2013.01); *B60G 2204/121* (2013.01); *B60G 2204/8302* (2013.01)

(58) Field of Classification Search
CPC ........ B60G 5/047; B60G 11/34; B60G 15/06; B60G 2200/30; B60G 2204/121; B60G 2202/112; B60G 2204/8302; B60G 5/053
See application file for complete search history.

(56) References Cited

U.S. PATENT DOCUMENTS

| 1,747,902 | A | * | 2/1930 | Marcum | B60G 5/047 105/82 |
| 2,083,661 | A | * | 6/1937 | Olley | B60G 11/36 267/171 |
| 2,169,242 | A | * | 8/1939 | Hickman | B60G 5/047 267/234 |
| 2,771,303 | A | * | 11/1956 | Frazier | B60G 5/047 267/64.19 |
| 2,811,213 | A | * | 10/1957 | Miller | B60G 5/047 180/24.12 |
| 2,900,197 | A | * | 8/1959 | Hutchens | B60G 5/047 267/66 |
| 3,166,142 | A | * | 1/1965 | Frazier | B60G 11/44 180/24.12 |
| 3,177,004 | A | * | 4/1965 | Schmidt | B60G 5/047 280/682 |
| 3,195,917 | A | * | 7/1965 | Holmes | B60G 5/047 280/683 |
| 3,198,542 | A | * | 8/1965 | Harbers | B60G 5/053 280/682 |
| 3,361,442 | A | * | 1/1968 | Willetts | B60G 5/03 267/282 |
| 3,504,929 | A | * | 4/1970 | King | B60G 5/047 280/124.175 |
| 3,602,523 | A | * | 8/1971 | Poulos | B60G 5/047 267/52 |

(Continued)

*Primary Examiner* — Paul N Dickson
*Assistant Examiner* — Timothy Wilhelm
(74) *Attorney, Agent, or Firm* — Karen B. Tripp

(57) ABSTRACT

An equalizer device for a suspension system of a vehicle having a tandem axle has an equalizer body adapted to cooperate with springs of a suspension system. A damping device has a first end that is pivotably mounted in a fixed location relative to the equalizer body and a second end that is pivotably mounted to the vehicle frame. The equalizer body is adaptable to pivoting to transfer a portion of an additional load carried on a forward axle through springs mounted thereon to springs of a rearward axle, thereby substantially equalizing load between the forward axle and the rearward axle. The damping device is adaptable to pivoting in response to pivoting of the equalizer body and dampens movement of the equalizer body when the equalizer body is pivoting to transfer the additional load.

19 Claims, 8 Drawing Sheets

(56) References Cited

U.S. PATENT DOCUMENTS

| | | | | |
|---|---|---|---|---|
| 3,767,222 | A | * | 10/1973 | Willetts .................... B60G 5/04 267/136 |
| 4,225,152 | A | * | 9/1980 | Eaton ...................... B60G 11/10 280/124.163 |
| 4,676,523 | A | * | 6/1987 | Rogers ..................... B60G 5/04 280/682 |
| 5,024,462 | A | | 6/1991 | Assh |
| 5,526,895 | A | * | 6/1996 | Shin ....................... B60G 5/047 180/236 |
| 5,816,605 | A | * | 10/1998 | Raidel, Sr. ............... B60G 5/00 280/426 |
| 6,015,158 | A | * | 1/2000 | Overby .................. B60G 11/10 280/11.225 |
| 6,224,074 | B1 | * | 5/2001 | Cadden .................... B60G 5/02 280/678 |
| 6,604,756 | B2 | * | 8/2003 | Simard .................... B60G 5/01 180/349 |
| 7,144,031 | B2 | * | 12/2006 | Fenton ..................... B60G 5/00 267/46 |
| 7,195,272 | B2 | * | 3/2007 | Larson ..................... B60G 5/00 267/52 |
| 7,296,821 | B2 | | 11/2007 | Fenton |
| 7,753,399 | B2 | | 7/2010 | Fenton |
| 7,753,400 | B2 | * | 7/2010 | Dunlap .................. B60G 5/047 280/682 |
| 7,854,445 | B2 | | 12/2010 | Fenton et al. |
| 7,918,478 | B2 | | 4/2011 | Fenton |
| 7,950,678 | B1 | * | 5/2011 | Bauder .................. B60G 5/047 280/124.17 |
| 2009/0250907 | A1 | * | 10/2009 | Preijert .................. B60G 5/047 280/682 |

\* cited by examiner

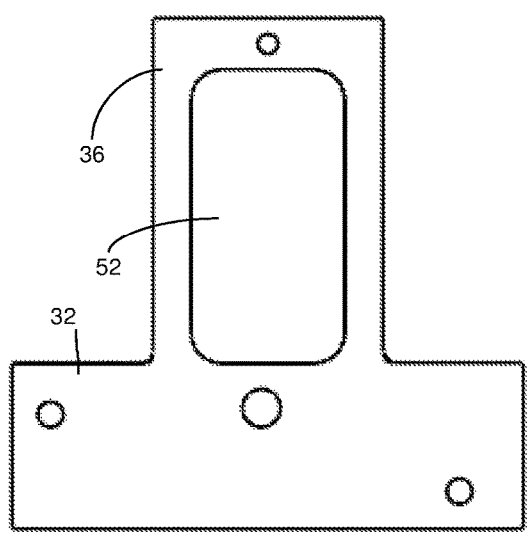
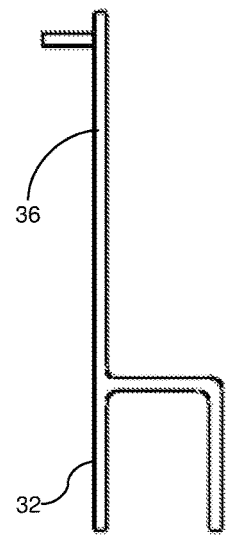
FIG. 6
FIG. 7
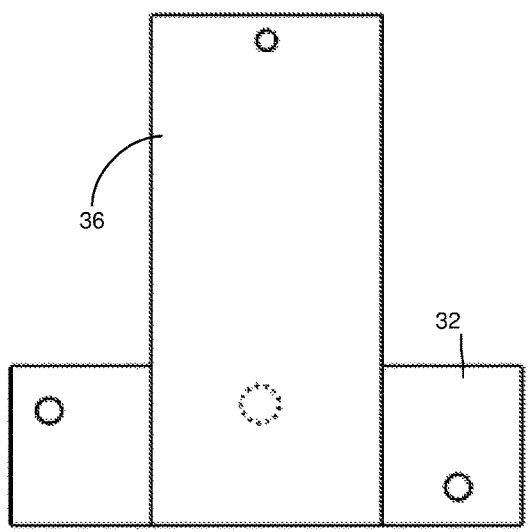
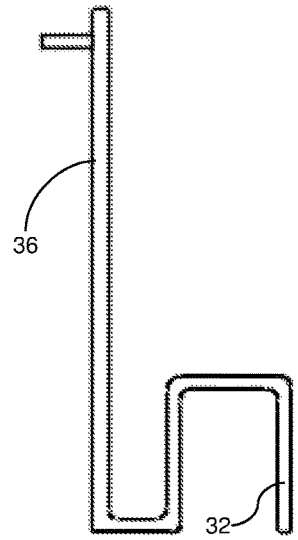
FIG. 8
FIG. 9

EQUALIZER DEVICE FOR TANDEM AXLE VEHICLES

FIELD OF THE INVENTION

The present relates to the field of vehicle suspension systems for tandem axle vehicles, and more particularly to an equalizer device for a tandem axle vehicle suspension system.

BACKGROUND OF THE INVENTION

Multi-axle vehicles used for carrying large loads of cargo or passengers often have at least one tandem axle, which is a group of two or more axles situated close together. Such tandem axles are used to provide greater weight capacity than a single axle. When a multi-axle vehicle is being driven, the vehicle is likely to encounter rough road, bumps, and the like that cause one axle of a tandem axle to move to a higher or lower level than its adjacent axle. Moreover, this axle movement may be more pronounced on one side of each axle.

With no suspension system, the road forces are transferred directly to the truck frame, causing a rough, and oftentimes unsafe, ride. Accordingly, in view of the greater weight capacity, additional consideration is given to suspension systems for multi-axle vehicles to provide safer transport for the driver, any passengers, and/or any cargo. As will be discussed more fully below, as it relates to "PRIOR ART" drawings FIG. 1 and FIG. 2, a conventional suspension system for a tandem axle vehicle has a pair of springs, most often a pair of leaf springs, and an equalizer between adjacent axles of a tandem axle.

Each leaf spring used in a suspension system for a tandem axle is typically mounted on one end to the vehicle frame through a hanger assembly. The other end of a leaf spring cooperates with the equalizer. The center portion of the leaf spring is mounted to one end of an axle, for example with a U-bolt.

Equalizers are used to help balance the load between adjacent axles of a tandem axle. An equalizer is pivotably mounted to the vehicle frame between adjacent axles. The equalizer is also adapted to directly or indirectly receive one end of a forward spring and one end of a rearward spring.

Leaf springs and equalizers cooperate to stabilize a vehicle on smooth roads, as well as over rough terrain. The suspension system cushions the chassis and enables the driver to better steer the vehicle under a variety of conditions. Ideally, a suspension system provides a smooth ride when both loaded and unloaded. However, when a spring is compressed in reaction to dissimilar weights/heights between axles or across an axle, the spring will eventually rebound causing the axle or end of that axle to kick back with force. Oscillation is a term of the art describing rhythmic or irregular vibrations in a suspension system. These oscillations are most prevalent when the vehicle is not loaded because the springs are designed to handle heavy loads and may not compress sufficiently with light weights. As a result, the vehicle will often resonate between tires as reactions to bumps are transferred back and forth between axles. Leaf springs are therefore often provided in a so-called spring pack to help dampen these oscillations through interleaf friction.

However, repeated oscillations can have adverse effects on tire wear, shimmying of the front wheels and/or spring breakage. Accordingly, there is a need for improving suspension systems and their components to balance loads on tandem axles, as well as to reduce oscillations.

To that end, U.S. Pat. No. 7,918,478B2 (Fenton) and its related patents (U.S. Pat. No. 7,296,821B2 (Fenton), U.S. Pat. No. 7,753,399B2 (Fenton et al) and U.S. Pat. No. 7,854,445B2 (Fenton et al)) describe an equalizer with internal elastomeric shock absorbing components of various shapes. The elastomeric pieces of the various embodiments in the Fenton and Fenton et al patents are designed to dampen or absorb harsh shocks or vibrations from the springs to provide a softer ride for the vehicle. As an equalizer arm moves upwardly, an internal shock plate is moved against the internal elastomeric shock absorber, causing deformation of the elastomeric shock absorber. According to the Fenton and Fenton et al patents, this deformation of the elastomeric shock absorber absorbs or dampens the harsh shocks or vibrations coming from the rear end of the leaf spring, which would otherwise be transferred through the equalizer to the center frame hanger and, thus, to the frame of the trailer.

Similarly, U.S. Pat. No. 7,753,400B2 (Dunlap et al) describes an equalizer with an integrated polymeric spring member. The integrated polymeric spring member is disposed between two arms of the equalizer, the arms in pivoting relationship to one another. Likewise, U.S. Pat. No. 3,504,929 (King) also shows an equalizer having pivoting arms. In this case, the arms have a spring disposed therebetween.

U.S. Pat. No. 5,024,462 (Assh) describes a combined air and leaf spring suspension for vehicles. The suspension has a load and shock transmitting lever at one end of a leaf spring. The other end of the lever has a pneumatic balloon solid with the end of the lever and the vehicle body. The pneumatic balloon has a hollow body with resilient sidewalls. A resilient damper element is disposed within the hollow body and is solid with the load and shock transmitting lever. The damper element projects upwardly and stops short of the vehicle body to define a stroke of a predetermined length.

U.S. Pat. No. 6,015,158 (Overby) relates to a front axle suspension having an equalizer assembly with a lever arm. The midpoint of the lever is connected to the rear end of a leaf spring and to one end of a shock absorber. A rubber or air spring is mounted on the forward end of the equalizer lever. When the wheel of the front axle hits a pot hole, the leaf spring drops down, causing the equalizer lever to move downwardly relative to the frame. The shock absorber dampens the downward movement of the midpoint of the lever. At the same time, movement of the lever causes the rubber or air spring to elongate. Once the wheel is out of the pot hole, the forward end of the lever moves up and compresses the rubber or air spring.

Each of these solutions to suspension system problems has a specific equalizer design and requires the specialized equalizer to be installed with the suspension system. None of these solutions can be readily combined with standard or other custom equalizer devices either to be sold or purchased together or as a kit for retrofitting an installed or separately purchased equalizer.

There is a need for a device that can be adapted to a variety of equalizer designs for damping shocks applied to axles of tandem axles. There is also a need for a kit that can be used to retrofit a conventional or other commercially available equalizer designs.

SUMMARY OF THE INVENTION

According to one aspect of the present invention, there is provided an equalizer device for a suspension system of a vehicle having a tandem axle, the suspension system having a pair of forward springs flexibly mounted on opposing sides of the vehicle, the pair of forward springs adapted to cooperate with opposing ends of a forward axle of the tandem axle extending between the pair of frame members, and a pair of rearward springs flexibly mounted on opposing sides of the vehicle, the pair of rearward springs adapted to cooperate with opposing ends of a rearward axle of the tandem axle, the equalizer device comprising: an equalizer body adapted to be pivotably mounted to a first of the pair of frame members of the vehicle, in a position between one of the pair of forward springs and one of the pair of rearward springs, the equalizer body adapted to cooperate with a rearward end of one of the pair of forward springs and a forward end of one of the pair of rearward springs; and a damping device having a first end and a second end, the first end of the damping device pivotably mounted in a fixed location relative to the equalizer body, the second end of the damping device adapted to be pivotably mounted to the first of the pair of frame members; whereby the equalizer body is adaptable to pivoting to transfer a portion of an additional load carried on the forward axle through one of the pair of forward springs to the rearward axle through one of the pair of rearward springs, thereby substantially equalizing load between the forward axle and the rearward axle, and whereby the damping device is adaptable to pivoting in response to pivoting of the equalizer body and dampens movement of the equalizer body when the equalizer body is pivoting to transfer the additional load.

According to another aspect of the present invention, there is provided a kit for retrofitting an equalizer device in a suspension system of a vehicle having a tandem axle, the suspension system having a pair of forward springs flexibly mounted on opposing sides of the vehicle, the pair of forward springs adapted to cooperate with opposing ends of a forward axle of the tandem axle extending between the pair of frame members, and a pair of rearward springs flexibly mounted on opposing sides of the vehicle, the pair of rearward springs adapted to cooperate with opposing ends of a rearward axle of the tandem axle, the equalizer device having an equalizer body pivotably mounted to a first of the pair of frame members of the vehicle, in a position between one of the pair of forward springs and one of the pair of rearward springs, the equalizer body cooperating with a rearward end of one of the pair of forward springs and a forward end of one of the pair of rearward springs; the kit for retrofitting the equalizer body comprising: a damping device having a first end and a second end; an equalizer-engaging bracket adapted to be fixedly mounted on the equalizer body in a manner that allows the equalizer bracket to pivot in response to pivoting by the equalizer body, the equalizer-engaging bracket having a damping device mounting member for pivotably engaging the first end of the damping device; a frame-engaging member adapted to be fixedly mounted on the first of the pair of frame members of the vehicle, the frame-engaging member further adapted for pivotably engaging the second end of the damping device; whereby the equalizer body retrofitted with the kit for retrofitting the equalizer body is adaptable to pivoting to transfer a portion of an additional load carried on the forward axle through one of the pair of forward springs to the rearward axle through one of the pair of rearward springs, thereby substantially equalizing load between the forward axle and the rearward axle, and whereby the damping device is adaptable to pivoting in response to pivoting of the equalizer body and dampens movement of the equalizer body when the equalizer body is pivoting to transfer the additional load.

BRIEF DESCRIPTION OF THE DRAWINGS

The present invention will be better understood by referring to the following detailed description of preferred embodiments and the drawings referenced therein, in which:

FIG. 6 is a front elevational view of one embodiment of an integrated equalizer-engaging bracket and a bar-type equalizer of the present invention;

FIG. 7 is a side elevational view of the FIG. 6 embodiment of an integrated equalizer-engaging bracket and a bar-type equalizer of the present invention;

FIG. 8 is a front elevational view of another embodiment of an integrated equalizer-engaging bracket and a bar-type equalizer of the present invention;

FIG. 9 is a side elevational view of the FIG. 8 embodiment of an integrated equalizer-engaging bracket and a bar-type equalizer of the present invention;

DETAILED DESCRIPTION OF THE INVENTION

The present invention provides an equalizer device for a tandem axle vehicle suspension system and a kit for retrofitting an equalizer device for a tandem axle vehicle suspension system. As used herein, the term "tandem axle" refers to two or more axles situated close to one another. For convenience, the drawings and related discussion below depict two axles of a tandem axle. However, it will be understood by those skilled in the art that the drawings and discussion are equally applicable to tandem axle systems having three or more axles. Further, reference to forward and rearward, as well as first and second, are relative terms that can equally apply to the first and second axles of a 2-, 3-, 4- or 5-axle tandem axle, and the third and fourth axles, for example, of a 4-, 5- or 6-axle tandem axle.

Also, as used herein, the word "vehicle" refers to trucks, pick-up trucks, busses, recreational vehicles, cars and the like, as well as trailers, pups, and the like that may be hitched, towed or otherwise coupled to a truck, pick-up truck, bus, recreational vehicle or car.

Figure 1:
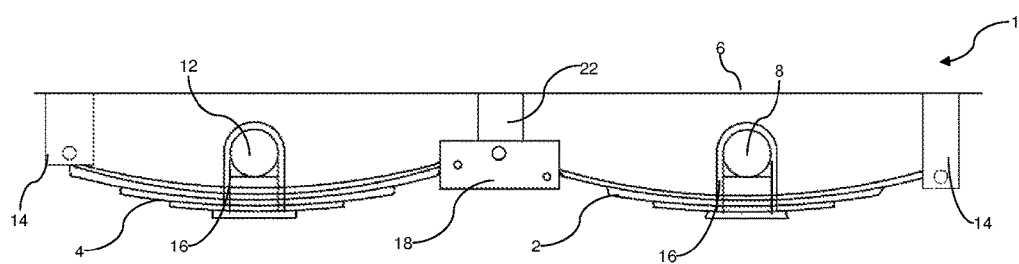
FIG. 1 is a side elevational view of a conventional suspension system in the prior art for a tandem axle of a vehicle having an equalizer bar.
Figure 2:
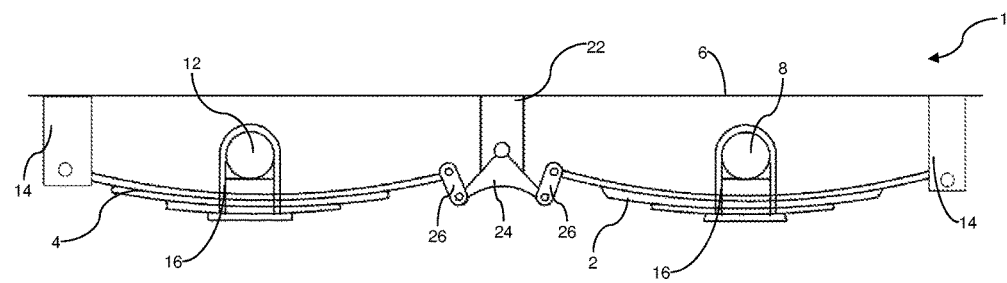
FIG. 2 is a side elevational view of another conventional suspension system in the prior art for a tandem axle of a vehicle having a triangular double-eye equalizer.

In order to more fully appreciate the present invention, reference is first made to FIGS. 1 and 2, showing conventional suspension systems for a tandem axle.

As shown in FIGS. 1 and 2, depicting PRIOR ART, a conventional suspension system 1 for a tandem axle of a vehicle has at least a pair of springs, most often a pair of leaf springs 2, 4, that are mounted parallel to longitudinally parallel frame members 6 of a vehicle frame. Leaf springs 2, 4 are most often manufactured from spring steel. The spring steel provides a leaf spring 2, 4 with sufficient flexibility, without permanently deforming a plate of the leaf spring 2, 4. The leaf spring 2, 4 depicted in FIGS. 1 and 2 is a steel plate or a stack of clamped steel plates forming a spring pack. A spring pack is particularly advantageous because the contact friction between plates provides some self-damping to the spring pack. It will be understood by those skilled in the art however that the present invention is equally applicable to single leaf springs, as well as other spring embodiments.

In FIGS. 1 and 2, only one of each pair of leaf springs 2, 4 is shown. For example, FIGS. 1 and 2 may depict the suspension system for the right side of the vehicle. The left side (US driver's side, for example) of the vehicle would be similarly equipped with the other of each pair of leaf springs 2, 4.

One pair of leaf springs 2 is forward of the other pair of leaf springs 4. The two leaf springs of the forward pair of leaf springs 2 cooperate with opposing ends of a forward axle 8, which extends between and perpendicular to the parallel frame members 6. Likewise, the two leaf springs of the rearward pair of leaf springs 4 cooperate with opposing ends of a rearward axle 12.

A forward end of a forwardmost leaf spring 2 and the rearward end of a rearwardmost leaf spring 4 are typically mounted to the vehicle frame 6 through a spring hanger assembly 14. The center portion of each leaf spring 2, 4 is mounted to one end of an axle 8, 12, for example with a U-bolt assembly 16.

At least one end of leaf spring 2, 4 cooperates directly or indirectly with an equalizer. In FIG. 1, the equalizer is an equalizer bar 18, which is mounted to the frame 6 between the forward axle 8 and the rearward axle 12 with an equalizer hanger assembly 22. In the system shown in FIG. 1, one end of each of the leaf springs 2,4 cooperates directly with the equalizer bar 18. In another conventional suspension system, as depicted in FIG. 2, the equalizer is a double-eye equalizer 24 having a substantially triangular relationship between a substantially central hole provided for a pivoting bolt connection to the equalizer hanger assembly 22 and two holes for a pivoting bolt connection to leaf springs 2, 4. In the system shown in FIG. 2, one end of each of the leaf springs 2,4 cooperates indirectly with the double-eye equalizer 24 through shackles 26. The double-eye equalizer 24 is also mounted to the frame 6 between the forward axle 8 and the rearward axle 12. Various configurations of the double-eye equalizer 24 are commercially available, while still having a substantially triangular relationship between the equalizer hanger bolt hole and the spring bolt holes. Other equalizer configurations are also available, with or without shackles 26, for example, without limitation, such as a so-called straight equalizer (3 holes substantially aligned) and a swan-shaped equalizer with one hole raised relative to the central hole and the other hole lower than the central hole.

Typically, for a given number of axles n in a tandem axle, there are n−1 equalizers on each side of the vehicle. So, in the case of a tandem axle having two axles, as shown in FIGS. 1 and 2, the rearward end of the forward leaf spring 2 and the forward end of the rearward leaf spring 4 cooperate with one equalizer 18, 24. In the case of a tandem axle having three axles, the rearward end of the forwardmost leaf spring 2 cooperates with a first equalizer 18, 24 and the forward end of the rearwardmost leaf spring 4 cooperates with a second equalizer 18, 24. Meanwhile, one end of an intermediate leaf spring (not shown) cooperates with the first equalizer 18, 24 and the other end of the intermediate leaf spring cooperates with the second equalizer 18, 24.

Examples of springs include slipper springs, double-eye springs and C-hook springs. A slipper spring has arcuate ends so that they can be seated into the body of a hanger assembly 14 on one end and an equalizer bar 18 on the other end. The ends of a double-eye spring are shaped into a round eye for receiving a bolt for attaching the spring to the hanger assembly 14 and a double-eye equalizer 24, directly or indirectly through a shackle 26. And a C-hook spring has an open ring end. Springs may also be provided with combinations of slippers, eyes and C-hooks on opposing ends.

Leaf springs 2, 4 and equalizers 18, 24 cooperate to stabilize a vehicle by cushioning the chassis and enabling a driver to better steer the vehicle under a variety of conditions.

When a forward axle 8 of a tandem axle encounters a bump, for example, the forward axle 8 moves upwardly relative to the rearward axle 12. Accordingly, the forward axle 8 assumes an additional load as compared to the rearward axle 12. The upward movement of the forward axle 8 compresses the forward leaf spring 2. In response, the equalizer 18, 24 pivots (counterclockwise as depicted in FIGS. 1 and 2) to transfer the additional load from the forward leaf spring 2 to the rearward spring 4, thereby substantially equalizing the load between the forward axle 8 and the rearward axle 12. Of course, the road condition affecting the forward axle 8 will later affect the rearward axle 12. The equalizer 18, 24 then responds in the opposite direction in response to further compression of the rearward spring 4. Ideally, a suspension system 1 provides a smooth ride when both loaded and unloaded.

However, when a leaf spring 2, 4 is compressed in reaction to dissimilar weights/heights between axles 8, 12 or across an axle 8, 12, the leaf spring 2, 4 will eventually rebound, causing the axle 8, 12 or end of that axle 8, 12 to kick back with force. This can result in an oscillation, which is a rhythmic or irregular vibration in a suspension system. These oscillations are most prevalent when the vehicle is not loaded because the springs are designed to handle heavy loads and may not compress sufficiently with light weights. As a result, the vehicle will often resonate between tires as reactions to bumps are transferred back and forth between axles.

In accordance with the present invention, the action of the equalizer 18, 24 is dampened with a damping device to lessen the occurrence and/or magnitude of the oscillations.

Figure 3:
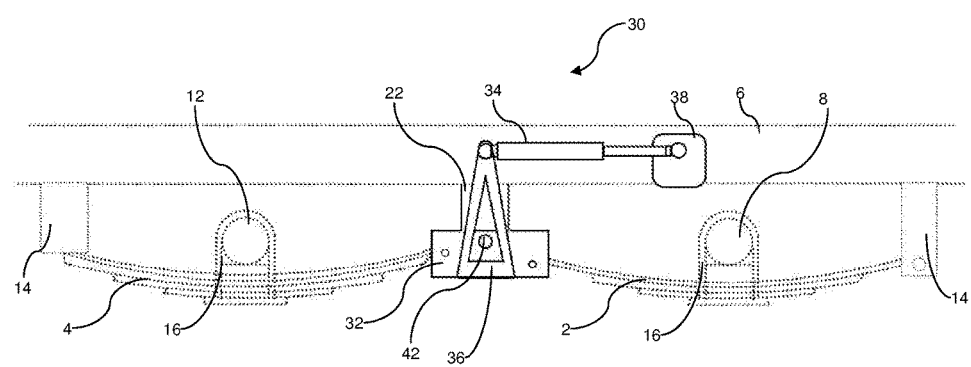
FIG. 3 is a side elevational view of an embodiment of the present invention for a suspension system having a bar-type equalizer body.

Referring now to FIG. 3, in one embodiment, an equalizer device 30 of the present invention has a bar-type equalizer body 32 and a damping device 34. The damping device 34 has a first end and a second end. The first end of the damping device 34 is pivotably mounted in a fixed location relative to the bar-type equalizer body 32, for example, with an equalizer-engaging bracket 36. The equalizer-engaging bracket 36 may be affixed to the bar-type equalizer body 32, for example, without limitation, by welding, riveting, or bolting.

The second end of the damping device 34 is pivotably mounted to the vehicle frame 6. The damping device 34 is shown as being positioned forward of the bar-type equalizer body 32. However, it will be understood that the damping device 34 may also be positioned rearward of the bar-type equalizer body 32 without departing from the spirit of the present invention.

The second end of the damping device 34 may be pivotably mounted in a variety of ways. Preferably, the damping device 34 is mounted with a frame-engaging bracket 38 having a post extending outwardly for receiving the second end of the damping device 34. However, it will be understood by those skilled in the art that a hole may be drilled through the frame 6 to allow a damping device mounting bolt (not shown) to pass through the frame member to engage the damping device 34, without the need for a frame-engaging bracket 38.

The drawings depict the damping device 34 as a shock absorber. However, it will be understood by those skilled in the art that other embodiments, such as, without limitation, a spring, may be used in place of the shock absorber without departing from the spirit of the present invention. A spring may be used directly or encased in a flexible sleeve, as an example.

Figure 4:
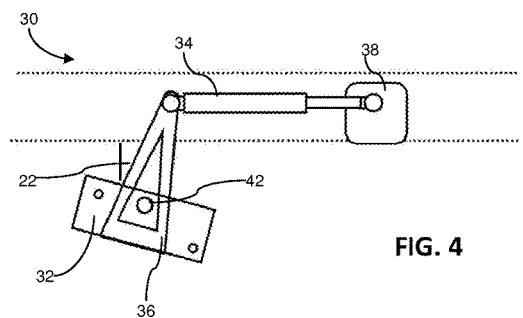
FIG. 4 is a partial side elevational view of the embodiment of FIG. 3 with the bar-type equalizer body in a pivoted position.

FIG. 4 illustrates how the damping device 34 responds to pivoting action by the bar-type equalizer body 32. The pivot point for the bar-type equalizer body 32 is equalizer bolt 42 used to mount the bar-type equalizer body 32 to equalizer hanger assembly 22. As one of the axles 8, 12 encounters an additional load, the leaf springs 2, 4 engage the bar-type equalizer body 32, causing the bar-type equalizer body 32 to pivot about the equalizer bolt 42. FIG. 4 depicts clockwise pivoting of the bar-type equalizer body 32 about the axis of equalizer bolt 42. The equalizer-engaging bracket 36 pivots with the bar-type equalizer body 32. Responsive to this pivot action, the damping device 34 is caused to compress or extend. In the load transfer movement depicted in FIG. 4, the damping device 34 is caused to compress against the movement of the bar-type equalizer body 32. The compression of the damping device 34 dampens the movement of the bar-type equalizer body 32 while the bar-type equalizer body 32 is pivoting to transfer the additional load on one axle 8, 12 to the leaf spring 2, 4 of the other axle 12, 8.

Figure 5:
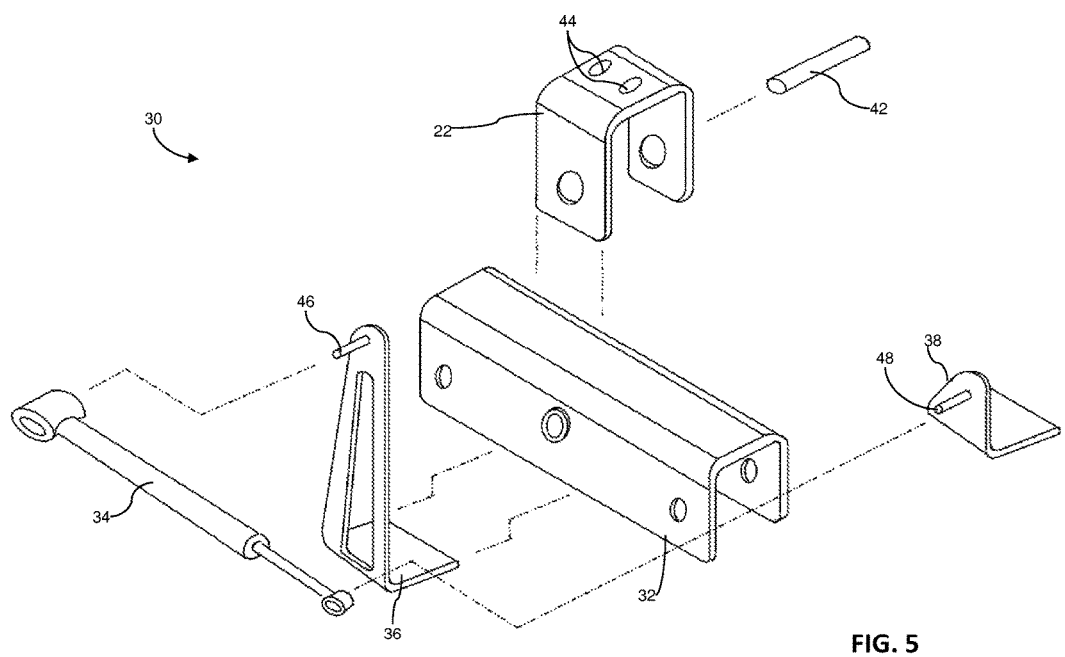
FIG. 5 is an exploded perspective view showing connection between components of the bar type equalizer device of FIG. 3.

FIG. 5 is an exploded view of one embodiment of the equalizer device 30 of the present invention, illustrating the interrelation between the equalizer hanger 22, the bar-type equalizer 32, the equalizer-engaging bracket 36, the frame-engaging bracket 38 and the damping device 34.

The equalizer hanger 22 is mounted to the frame member 6 with bolts (not shown) through holes 44. The bar-type equalizer body 32 is then placed inside the equalizer hanger 22, aligning holes for inserting the equalizer bolt 42. The bar-type equalizer body 32 is then typically welded into place inside the equalizer hanger 22. The equalizer-engaging bracket 36 is then positioned on the bar-type equalizer body 32 to substantially vertically align the first post 46 with the end of the equalizer bolt 42 and, for example, welded in place on the bar-type equalizer body 32. The frame-engaging bracket 38 is mounted to the frame 6, for example by welding, such that second post 48 is positioned a predetermined distance from the first post 46 corresponding to the distance between the first and second ends of the damping device 34 in its neutral position, which allows for compression and extension of the damping device 34. The damping device 34 is then secured to the equalizer-engaging bracket 36 and the frame-engaging bracket 38 through first and second posts 46, 48, respectively, in a manner that allows the first and second ends of the damping device 34 to pivot about the first and second posts 46, 48. The placement and assembly of the remaining conventional suspension system components is not described here for ease of discussion. However, it will be understood by those skilled in the art how to accomplish this.

The embodiments of the invention illustrated in FIGS. 3-5 show an equalizer-engaging bracket 36 having a substantially triangular shape with a substantially triangular shaped cut-out. However, it will be understood that other shapes, with or without cut-outs, may be used without departing from the spirit of the present invention.

While a particular advantage of the present invention is its applicability to commercially available equalizers, it will be understood by those skilled in the art that the equalizer-engaging bracket 36 may be integrally formed with the bar-type equalizer body 32, without departing from the spirit of the invention.

Two embodiments of an integrated bar-type equalizer 32 and equalizer-engaging bracket 36 are depicted in FIGS. 6-9. The integrated bar-type equalizer 32 and equalizer-engaging bracket 36 shown in FIGS. 6 and 7 has a substantially h-shaped cross-section with a cut-out 52 that allows for cooperation with an equalizer hanger 22. In the embodiment of the integrated bar-type equalizer 32 and equalizer-engaging bracket 36 shown in FIGS. 8 and 9, the equalizer-engaging bracket 36 is set outwardly from the bar-type equalizer body 32 with a substantially S-shaped cross-section. The integrated equalizer-engaging bracket 36 is shown as substantially rectangular in FIGS. 6 and 8, with a substantially rectangular cut-out in the FIG. 6 embodiment. However, it will be understood that other shapes, with or without cut-outs, may be used without departing from the spirit of the present invention.

Figure 10:
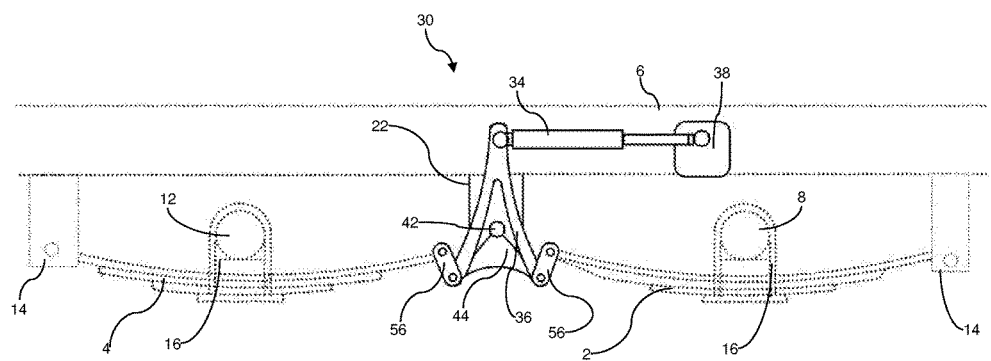
FIG. 10 is a side elevational view of another embodiment of the present invention for a suspension system having a triangular double-eye equalizer.

Referring now to FIG. 10, in another embodiment, an equalizer device 30 of the present invention has a double-eye equalizer body 44 and a damping device 34. The damping device 34 has a first end and a second end. The first end of the damping device 34 is pivotably mounted in a fixed location relative to the double-eye equalizer body 44, for example, with an equalizer-engaging bracket 36. The equalizer-engaging bracket 36 may be affixed to the double-eye equalizer body 44, for example, without limitation, by welding, riveting, or bolting.

The second end of the damping device 34 is pivotably mounted to the vehicle frame 6. The damping device 34 is shown as being positioned forward of the double-eye equalizer body 44. However, it will be understood that the damping device 34 may also be positioned rearward of the double-eye equalizer body 44 without departing from the spirit of the present invention.

The second end of the damping device 34 may be pivotably mounted in a variety of ways. Preferably, the damping device 34 is mounted with a frame-engaging bracket 38 having a post extending outwardly for receiving the second end of the damping device 34. However, it will be understood by those skilled in the art that a hole may be drilled through the frame 6 to allow a damping device mounting bolt (not shown) to pass through the frame member to engage the damping device 34, without the need for a frame-engaging bracket 38.

Figure 11:
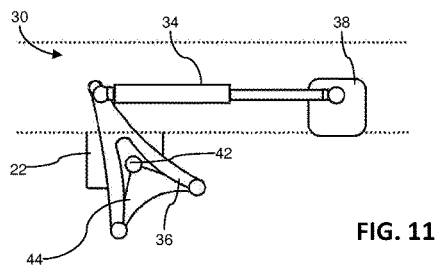
FIG. 11 is a partial side elevational view of the embodiment of FIG. 10 with the triangular double-eye equalizer body in a pivoted position.
Figure 12:
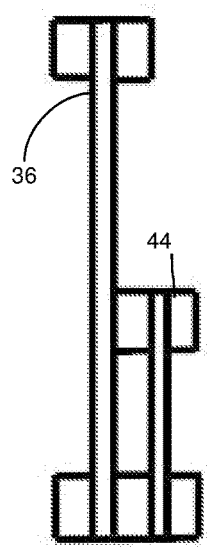
FIG. 12 is a side elevational view of one embodiment of an integrated equalizer-engaging bracket and a double-eye equalizer body of the present invention.
Figure 13:
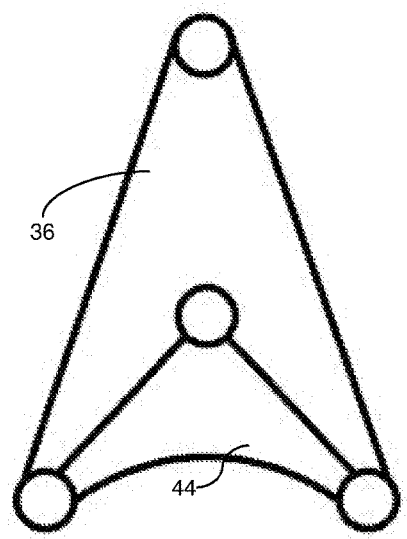
FIG. 13 is a front elevational view of the FIG. 12 embodiment of an integrated equalizer-engaging bracket and a double-eye equalizer body of the present invention.
Figure 14:
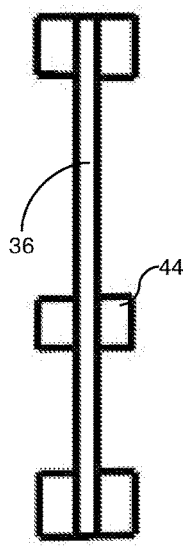
FIG. 14 is a side elevational view of another embodiment of an integrated equalizer-engaging bracket and a double-eye equalizer body of the present invention.
Figure 15:
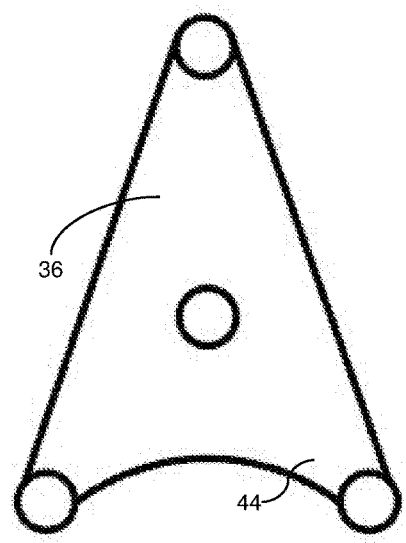
FIG. 15 is a front elevational view of the FIG. 14 embodiment of an integrated equalizer-engaging bracket and a double-eye equalizer body of the present invention.

The embodiment of the equalizer device 30 of the present invention shown in FIG. 10 operates in a similar fashion as the FIG. 3 embodiment, as demonstrated in FIG. 11. The double-eye equalizer body 44 pivots about equalizer bolt 42 used to mount the double-eye equalizer body 44 to equalizer hanger assembly 22. FIG. 11 illustrates how the damping device 34 responds to pivoting action by the double-eye equalizer body 44. The pivot point for the double-eye equalizer body 44 is equalizer bolt 42 used to mount the double-eye equalizer body 44 to equalizer hanger assembly 22. As one of the axles 8, 12 encounters an additional load, the leaf springs 2, 4 engage the double-eye equalizer body 44, through shackles 56, causing the double-eye equalizer body 44 to pivot about the equalizer bolt 42. FIG. 11 depicts counter-clockwise pivoting of the double-eye equalizer body 44 about the axis of equalizer bolt 42. The equalizer-engaging bracket 36 pivots with the double-eye equalizer body 44. Responsive to this pivot action, the damping device 34 is caused to compress or extend. In the load transfer movement depicted in FIG. 11, the damping device 34 is caused to extend against the movement of the double-eye equalizer body 44. The extension of the damping device 34 dampens the movement of the double-eye equalizer body 44 while the double-eye equalizer body 44 is pivoting to transfer the additional load on one axle 8, 12 to the leaf spring 2, 4 of the other axle 12, 8.

While a particular advantage of the present invention is its applicability to commercially available equalizers, it will be understood by those skilled in the art that the equalizer-engaging bracket 36 may be integrally formed with the double-eye equalizer body 44, without departing from the spirit of the invention.

Two embodiments of an integrated double-eye equalizer 44 and equalizer-engaging bracket 36 are depicted in FIGS. 12-15. The integrated double-eye equalizer 44 and equalizer-engaging bracket 36 shown in FIGS. 12 and 13 has two substantially triangular plates with a common hole for an equalizer bolt (not shown) and a pair of common holes for connecting leaf spring bolts (not shown). An uppermost hole is provided for receiving the first end of the damping device 34. In the embodiment of the integrated double-eye equalizer 44 and equalizer-engaging bracket 36 shown in FIGS. 14 and 15, the equalizer-engaging bracket 36 and the double-eye equalizer 44 share a substantially triangular plate. It will be understood that other shapes, with or without cut-outs, may be used without departing from the spirit of the present invention.

The equalizer device of the present invention may also be provided as a kit for retrofitting an equalizer. Although component parts of the present invention have already been described in the drawings and description herein, FIG. 16 depicts one embodiment of a kit 40 of the present invention for retrofitting an equalizer.

Figure 16:
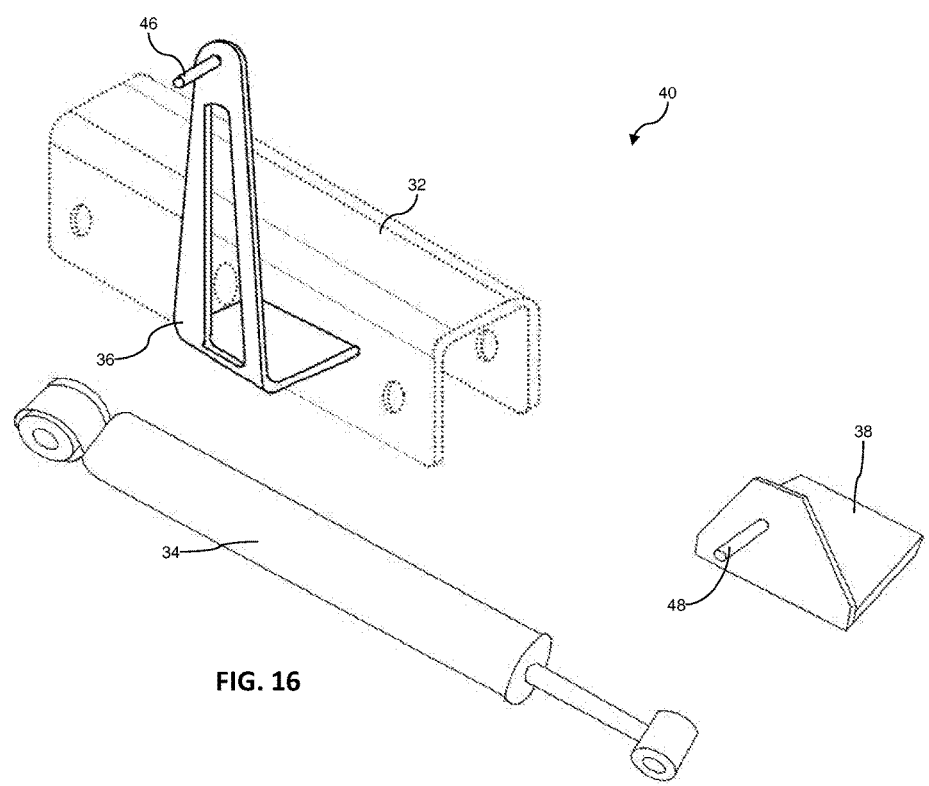
FIG. 16 depicts one embodiment of a kit of the present invention for retrofitting an equalizer.

In FIG. 16, the equalizer to be retrofitted is a bar-type equalizer 32. The equalizer-engaging bracket 36 provided in the kit 40 can be attached to the bar-type equalizer 32, without limitation, by bolting, riveting or welding. The kit 40 also has a frame-engaging member. In the embodiment shown in FIG. 16, the frame-engaging member is a frame-engaging bracket 38 that may be mounted to the frame member 6 (not shown in FIG. 16) with bolts or by welding or riveting, for example. Alternatively, the frame-engaging member may be a bolt (not shown) that passes through a hole in the frame member 6 (not shown in FIG. 16).

The damping device 34 is operatively connected to the equalizer-engaging bracket 36 and the frame-engaging bracket 38 through first and second posts 46, 48, respectively, in a manner that allows the first and second ends of the damping device 34 to pivot about the first and second posts 46, 48.

Figure 17:
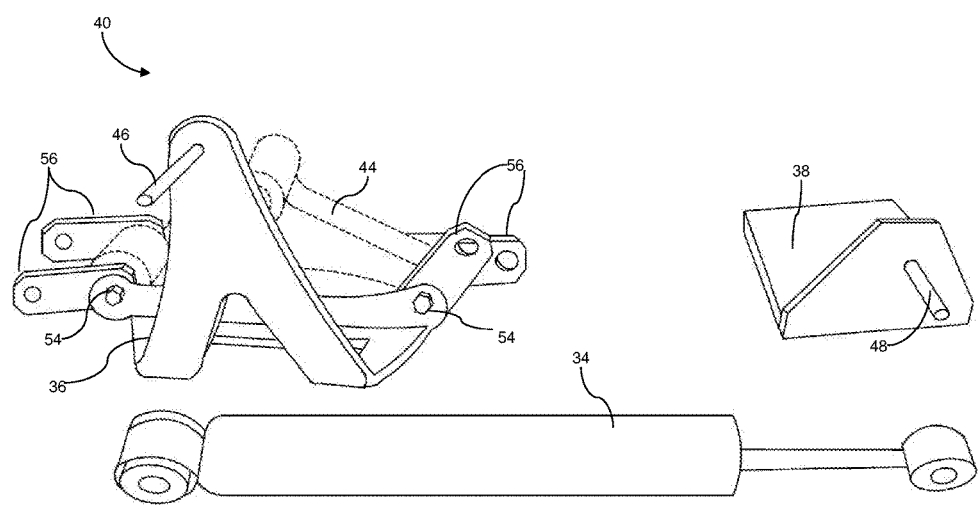
FIG. 17 depicts another embodiment of a kit of the present invention for retrofitting an equalizer.

FIG. 17 depicts another embodiment of a kit 40 of the present invention for retrofitting an equalizer. In FIG. 17, the equalizer to be retrofitted is a double-eye equalizer 44. The equalizer-engaging bracket 36 provided in the kit 40 can be bolted to the double-eye equalizer 44 with existing bolts used to connect to leaf springs 2, 4 (not shown in FIG. 17) or with optional bolts 54 provided in the kit 40. The optional bolts 54 may also be used to attach optional shackles 56 for connection to leaf springs 2, 4 (not shown in FIG. 17).

The kit 40 also has a frame-engaging member. In the embodiment shown in FIG. 17, the frame-engaging member is a frame-engaging bracket 38 that may be mounted to the frame member 6 (not shown in FIG. 17) with bolts or by welding or riveting, for example. Alternatively, the frame-engaging member may be a bolt (not shown) that passes through a hole in the frame member 6 (not shown in FIG. 17).

The damping device 34 is operatively connected to the equalizer-engaging bracket 36 and the frame-engaging bracket 38 through first and second posts 46, 48, respectively, in a manner that allows the first and second ends of the damping device 34 to pivot about the first and second posts 46, 48.

It will be understood by those skilled in the art that shackles 56 may be optionally used in the various embodiments depicted in the drawings, as a matter of preference and needs. It will also be understood by those skilled in the art that the frame-engaging bracket 36 of the various embodiments of the present invention may be configured to have an adjustable height mechanism without departing from the spirit of the present invention.

I claim:

1. An equalizer device for a suspension system of a vehicle having a tandem axle, the suspension system having a pair of forward springs flexibly mounted on opposing sides of the vehicle, the pair of forward springs adapted to cooperate with opposing ends of a forward axle of the tandem axle extending between the pair of frame members, and a pair of rearward springs flexibly mounted on opposing sides of the vehicle, the pair of rearward springs adapted to cooperate with opposing ends of a rearward axle of the tandem axle, the equalizer device comprising:

an equalizer body adapted to be pivotably mounted to a first of the pair of frame members of the vehicle, in a position between one of the pair of forward springs and one of the pair of rearward springs, the equalizer body adapted to cooperate with a rearward end of one of the pair of forward springs and a forward end of one of the pair of rearward springs; and a damping device having a first end and a second end, the first end of the damping device pivotably mounted in a fixed location relative to the equalizer body, the second end of the damping device adapted to be pivotably mounted to the first of the pair of frame members;

whereby the equalizer body is adaptable to pivoting to transfer a portion of an additional load carried on the forward axle through one of the pair of forward springs to the rearward axle through one of the pair of rearward springs, thereby substantially equalizing load between the forward axle and the rearward axle, and whereby the damping device is adaptable to pivoting in response to pivoting of the equalizer body and dampens movement of the equalizer body when the equalizer body is pivoting to transfer the additional load.

2. The equalizer device of claim 1, further comprising a frame-engaging member adapted to be fixedly mounted to the first of the pair of frame members, the frame-engaging member further adapted for pivotably engaging the second end of the damping device.

3. The equalizer device of claim 1, wherein the frame-engaging member is a frame-engaging bracket having a post for pivotably engaging the second end of the damping device.

4. The equalizer device of claim 1, wherein the frame-engaging member is a frame-engaging bolt for pivotably engaging the second end of the damping device.

5. The equalizer device of claim 1, further comprising an equalizer-engaging bracket adapted to be fixedly mounted to the equalizer body in a manner that allows the equalizer-engaging bracket to pivot in response to pivoting by the equalizer body, the equalizer-engaging bracket having a damping device mounting member for pivotably engaging the first end of the damping device.

6. The equalizer device of claim 5, wherein the equalizer-engaging bracket is integral with the equalizer body.

7. The equalizer device of claim 1, further comprising an equalizer hanger assembly for mounting the equalizer body to the first of the pair of frame members of the vehicle.

8. The equalizer device of claim 1, wherein the damping device is a shock absorber.

9. The equalizer device of claim 1, wherein the damping device is a spring.

10. The equalizer device of claim 1, wherein the vehicle is a trailer.

11. A kit for retrofitting an equalizer device in a suspension system of a vehicle having a tandem axle, the suspension system having a pair of forward springs flexibly mounted on opposing sides of the vehicle, the pair of forward springs adapted to cooperate with opposing ends of a forward axle of the tandem axle extending between the pair of frame members, and a pair of rearward springs flexibly mounted on opposing sides of the vehicle, the pair of rearward springs adapted to cooperate with opposing ends of a rearward axle of the tandem axle, the equalizer device having an equalizer body pivotably mounted to a first of the pair of frame members of the vehicle, in a position between one of the pair of forward springs and one of the pair of rearward springs, the equalizer body cooperating with a rearward end of one of the pair of forward springs and a forward end of one of the pair of rearward springs; the kit for retrofitting an equalizer device comprising:

a damping device having a first end and a second end;

an equalizer-engaging bracket adapted to be fixedly mounted on the equalizer body in a manner that allows the equalizer-engaging bracket to pivot in response to pivoting by the equalizer body, the equalizer-engaging bracket having a damping device mounting member for pivotably engaging the first end of the damping device;

a frame-engaging member adapted to be fixedly mounted on the first of the pair of frame members of the vehicle, the frame-engaging member further adapted for pivotably engaging the second end of the damping device;

whereby the equalizer body retrofitted with the kit for retrofitting the equalizer body is adaptable to pivoting to transfer a portion of an additional load carried on the forward axle through one of the pair of forward springs to the rearward axle through one of the pair of rearward springs, thereby substantially equalizing load between the forward axle and the rearward axle, and whereby the damping device is adaptable to pivoting in response to pivoting of the equalizer body and dampens movement of the equalizer body when the equalizer body is pivoting to transfer the additional load.

12. The kit for retrofitting an equalizer device of claim 11, wherein the frame-engaging member is a frame-engaging bracket having a post for pivotably engaging the second end of the damping device.

13. The kit for retrofitting an equalizer device of claim 11, wherein the frame-engaging member is a frame-engaging bolt for pivotably engaging the second end of the damping device.

14. The kit for retrofitting an equalizer device of claim 11, further comprising shackles.

15. The kit for retrofitting an equalizer device of claim 11, further comprising an equalizer bolt.

16. The kit for retrofitting an equalizer device of claim 11, further comprising a pair of bolts for connecting one of the pair of forward springs and one of the pair of rearward springs to the equalizer and the equalizer-engaging bracket.

17. The kit for retrofitting an equalizer device of claim 11, wherein the damping device is a shock absorber.

18. The kit for retrofitting an equalizer device of claim 11, wherein the damping device is a spring.

19. The kit for retrofitting an equalizer device of claim 11, wherein the vehicle is a trailer.

* * * * *